United States Patent
Hur et al.

(10) Patent No.: US 6,556,642 B2
(45) Date of Patent: Apr. 29, 2003

(54) INHIBITION METHOD OF THE SECONDARY SIDE STRESS CORROSION CRACKING IN NUCLEAR STEAM GENERATOR TUBES

(75) Inventors: Do Haeng Hur, Jeonmin-dong (KR); Joung Soo Kim, Oun-dong (KR)

(73) Assignees: Korea Atomic Energy Research Institute, Taejon-si (KR); Korea Electric Power Corporation, Seoul (KR)

(*) Notice: Subject to any disclaimer, the term of this patent is extended or adjusted under 35 U.S.C. 154(b) by 0 days.

(21) Appl. No.: 10/004,140

(22) Filed: Oct. 23, 2001

(65) Prior Publication Data

US 2002/0136345 A1 Sep. 26, 2002

(30) Foreign Application Priority Data

Mar. 26, 2001 (KR) ............................ 01-015552

(51) Int. Cl.[7] ................................ G21C 9/00
(52) U.S. Cl. ................ 376/305; 376/306; 252/387; 252/389.41; 204/292; 204/290.4; 422/14; 422/19; 422/53; 422/7; 427/436; 436/6
(58) Field of Search ................ 376/305, 306; 252/387, 389.41; 204/292, 290.4; 422/14, 19, 53, 7; 427/436; 436/6

(56) References Cited

U.S. PATENT DOCUMENTS

| | | | | |
|---|---|---|---|---|
| 4,297,246 A | * | 10/1981 | Cairns et al. | 148/28 |
| 4,728,452 A | * | 3/1988 | Hansen | 252/387 |
| 4,764,337 A | * | 8/1988 | Panson | 252/389.41 |
| 5,019,225 A | * | 5/1991 | Darracq et al. | 204/247.3 |
| 6,277,187 B1 | * | 8/2001 | Kuno et al. | 106/287.16 |

FOREIGN PATENT DOCUMENTS

DE  207649  * 8/1973

OTHER PUBLICATIONS

Byers et al, Control of Lead–assisted stress corrsion cracking of Alloy 600 tubing, 1998 JAIF Conference, pp. 944 to 951.*
Nordmann et al, Selection criteria for the best secondary water chemistry, Nuclear Engineering & Design, 160, (1996) pp. 193 to 201.*
Byers et al, Control of Lead–assisted corrosion cracking of alloy 600 tubing in steam generator free span locations, ANS International symposium, Aug. 10–14 1997, vol. 1, 224–231.*

(List continued on next page.)

Primary Examiner—Michael J. Carone
Assistant Examiner—John Richardson
(74) Attorney, Agent, or Firm—Bachman & LaPointe, P.C.

(57) ABSTRACT

The present invention relates to a method for inhibiting stress corrosion cracking occurring on steam generator tubes in the secondary side of nuclear power plants and an inhibitor therefor. The method comprises supplying cerium boride as an inhibitor for stress corrosion cracking into the secondary feed water of the nuclear power plants. The method according to the present invention improves resistance of stress corrosion cracking three times or higher than no inhibitor, and two times or higher than the conventional inhibitor. In particular, the method according to the present invention shows a superior inhibiting effect in the lead-contaminated environment such that the complete inhibition of stress corrosion cracking can be achieved. As thus, the method can reduce the unexpected stop of operating nuclear power plants caused by the stress corrosion cracking on steam generator tubes, thereby reducing the cost required for maintaining and repairing the tubes.

7 Claims, 5 Drawing Sheets

OTHER PUBLICATIONS

Aballe et al, Green inhibitors: Rare Earth based systems, Revista de Metalurgia, Nov. 1997, pp. 363 to 369.*

Lu et al, Chemical treatment with cerium to improve the crevice corrsion resistance of austenitic stainless steels, corrosion Science, vol. 37, No. 1, pp. 145–155, 1995.*

Wilson et al, New green inhibitors incorporating a rare earth and an organic compound for corrosion mitigation, Proceediings of $9^{th}$ European symposium on corrosion inhibitors, Ferrara, Italy, 200., p. 1125 to 1140.*

Mansfield et al, use of rare earth metal salt solutions for corrosion protection of aluminum alloys and mild steel, Russian Journal of Electrochemistry, vol. 36, No. 10, pp 1063–1071, 2000.*

An article entitled "Mechanism and Effectiveness of Inhibitors for SCC in a Caustic Environment," by Lumsden et al., Proceedings of Seventh International Symposium on Environmental Degradation of Materials in Nuclear Power Systems–Water Reactors, pp. 317–325 (1995).

An article entitled "Slow Strain Rate Testing to Evaluate Inhibitors for Stress Corrosion Cracking of Alloy 600," By B. P. Miglin et al., Proceedings of Sixth International Symposium on Environmental Degradation of Materials in Nuclear Power Systems–Water Reactors, pp. 303–309 (1993).

An article entitled "Secondary Side Degradation of Steam Generating Tubing . . .," By Daret et al., Proceedings of Eighth International Symposium on Environmental Degradation of Materials in Nuclear Power Systems–Water Reactors, pp. 100–107 (1997).

* cited by examiner

INHIBITION METHOD OF THE SECONDARY SIDE STRESS CORROSION CRACKING IN NUCLEAR STEAM GENERATOR TUBES

FIELD OF THE INVENTION

The present invention relates to a method for inhibiting stress corrosion cracking occurring on steam generator tubes in the secondary side of nuclear power plants (NPPs) and an inhibitor therefor.

BACKGROUND OF THE INVENTION

It was reported that Ni alloys, especially, ones used as steam generator tubes in nuclear power plants, frequently suffered from intergranular corrosion and stress corrosion cracking in the environment. The intergranular corrosion and stress corrosion cracking occurring on steam generator tubes in NPPs may result in the leakage of the primary cooling water into the secondary side, unexpected stop of operating NPPs, and high cost for inspecting and repairing the cracked tubes. Therefore, an inhibitor for the intergranular corrosion and stress corrosion cracking occurring on steam generator tubes in NPPs is urgently demanded.

Up to now, boric acid has been used as an inhibitor for stress corrosion cracking. However, it was proved not to be an effective inhibitor in inhibiting the intergranular corrosion and stress corrosion cracking on steam generator tubes in NPPs.

Recently, titanium oxide as an inhibitor, which introduces into the high temperature and high alkali feed water so as to inhibit stress corrosion cracking, was reported. However, quantitative analysis of its effectiveness in inhibiting the intergranular corrosion and stress corrosion cracking has not been performed yet.

Furthermore, an inhibitor or a method for inhibiting stress corrosion cracking occurring on steam generator tubes in environments contaminated with at least one lead compound such as lead oxide, lead chloride, lead sulfide which were known to accelerate stress corrosion cracking has not been developed yet.

SUMMARY OF THE INVENTION

Leading to the present invention, the intensive and thorough research on an inhibitor or a method for inhibiting stress corrosion cracking occurring on steam generator tubes in the secondary side of NPPs carried out by the present inventors aiming to avoid the problems encountered in the prior arts, and resulted in the finding that the powerful inhibition of intergranular corrosion and stress corrosion cracking occurring on steam generator tubes, compared with no inhibitor or the conventional inhibitors such as boric acid and titanium oxide, can be achieved by supplying the cerium boride as an inhibitor into the secondary side feed water of NPPs.

Therefore, it is an object of the present invention to provide a novel inhibitor in order to overcome the problems caused by the intergranular corrosion and stress corrosion cracking occurring on steam generator tubes in the secondary side of the NPPs.

It is another object of the present invention to provide cerium boride as an inhibitor for intergranular corrosion and stress corrosion cracking occurring on steam generator tubes in the secondary side of the NPPs.

And, it is a further object of the present invention to provide a method for inhibiting the intergranular corrosion and stress corrosion cracking occurring on steam generator tubes in the secondary side of NPPs, which comprises supplying the cerium boride as an inhibitor into the secondary feed water to form chromium-enriched oxide film on the surface of steam generator tubes.

DETAILED DESCRIPTION OF THE INVENTION

The present inventors discovered that the cerium boride can significantly reduce the susceptibility of steam generator tubes to intergranular corrosion and stress corrosion cracking in the caustic environment.

The cerium boride in an amount of from about 0.1 ppb to 100 ppm as an inhibitor for stress corrosion cracking is preferably added into the secondary feed water. More preferably is from 0.1 ppb to 50 ppm.

Figure 1:
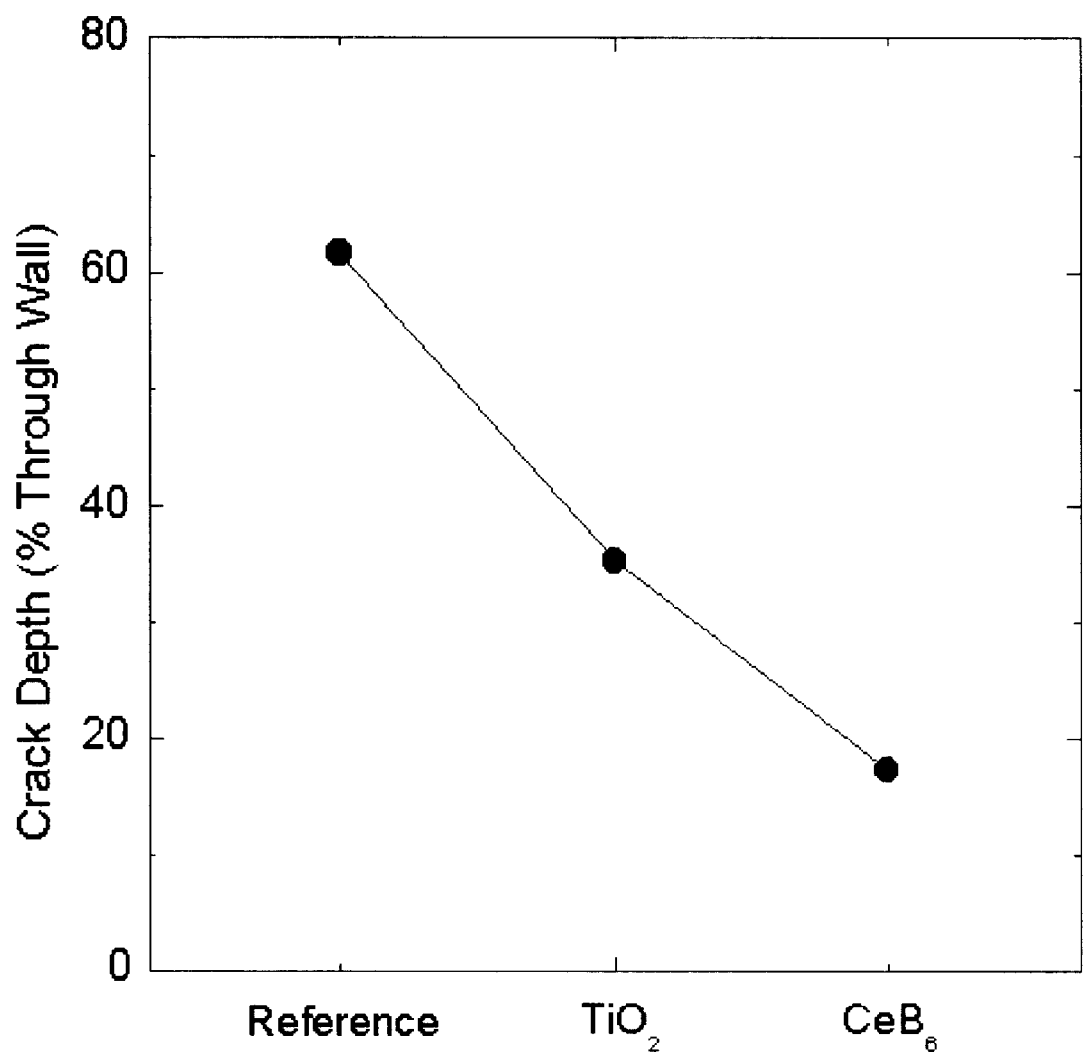
FIG. 1 is a graph showing the relative inhibiting effect on stress corrosion cracking in a caustic solution containing no inhibitor ("reference"), a conventional inhibitor("$TiO_2$"), and an inhibitor("$CeB_6$") according to the present invention.

According to the embodiment of the present invention, the cerium boride improves the resistance to intergranular corrosion and stress corrosion cracking three times or higher than no inhibitor, and two times or higher than the conventional inhibitor, titanium oxide. This is shown in FIG. 1.

Figure 5:
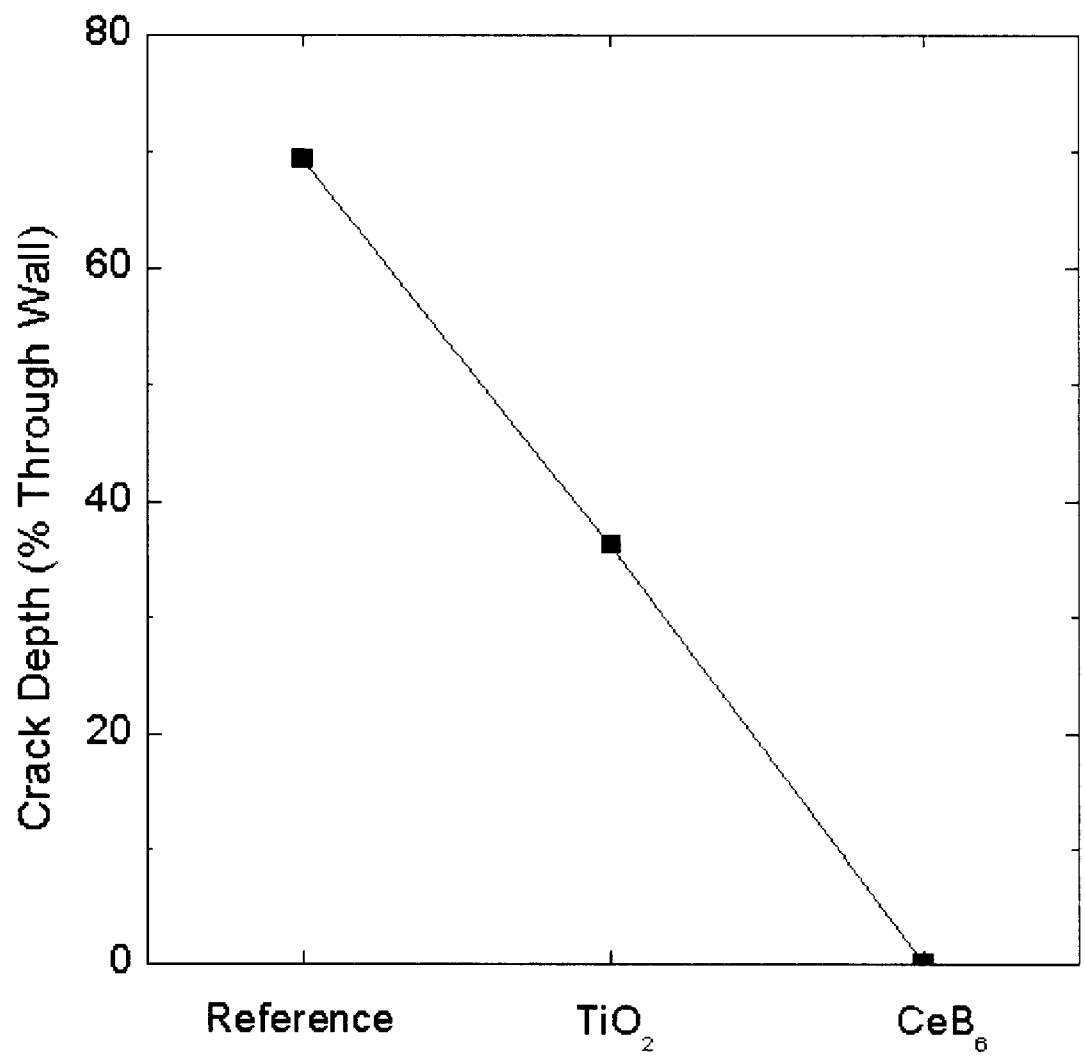
FIG. 5 is a graph showing the relative inhibiting effect on stress corrosion cracking in the lead oxide-contaminated caustic environment.

Recently, it was reported that the lead compounds such as lead oxide, lead chloride, lead sulfide accelerate stress corrosion cracking occurring on steam generator tubes in the secondary side of NPPs. According to another embodiment of the present invention, the inhibitor also showed a very powerful inhibition of stress corrosion cracking in the lead-contaminated caustic environment. This is shown in FIG. 5.

The present invention also relates to a method for inhibiting intergranular corrosion and stress corrosion cracking occurring on steam generator tubes in the secondary side of NPPs. The method comprises supplying the cerium boride as an inhibitor for stress corrosion cracking into the secondary feed water of NPPs. More specifically, the method comprises supplying the cerium boride in the amount ranging from 0.1 ppb to 100 ppm into the secondary feed water of NPPs. The room temperature pH of the secondary feed water is generally varied from 5.0 to 9.5; the temperature is lower than 330° C., more preferably, 150–315° C.

The cerium boride added to the secondary feed water has a protective film formed on the surface of steam generator tubes. The protective film can be formed by circulating the secondary feed water under the normal operating conditions, or by stopping it for from 0.5 to 240 hours. Particularly, the protective film formed in the solution containing the cerium boride has been found to show a powerful inhibiting effect on the stress corrosion cracking occurring on steam generator tubes in the environment contaminated with the lead compounds.

The application of the preferred embodiments of the present invention is best understood with examples and the accompanying drawings.

FIG. 1 is a graph showing the relative inhibiting effects on stress corrosion cracking of Alloy 600 steam generator tubes for no inhibitor ("reference"), titanium oxide, and cerium boride according to present invention, respectively.

The experiments were carried in 10% NaOH solution at 315° C., because the stress corrosion cracking in the secondary side of steam generator tubes was frequently observed to occur in a high-alkali environment during the operation of the steam generator.

The specimens for the stress corrosion cracking test were fabricated as C-ring and stressed until their outer diameter was deflected by 1.5 mm. To accelerate the stress corrosion cracking rate, the specimens were polarized at a potential of 150 mV above the corrosion potential. The amount of the inhibitors used was 4 g/L. After 5 days, the percentage of the stress corrosion crack depth relative to the thickness of the specimen was measured and the result thereof was shown in FIG. 1. As shown in FIG. 1, the cerium boride according to the present invention has highly improved the resistance to stress corrosion cracking three times or higher than no inhibitor (which is denoted as "reference"), and two times or higher than the conventional inhibitor, titanium oxide.

Figure 2:
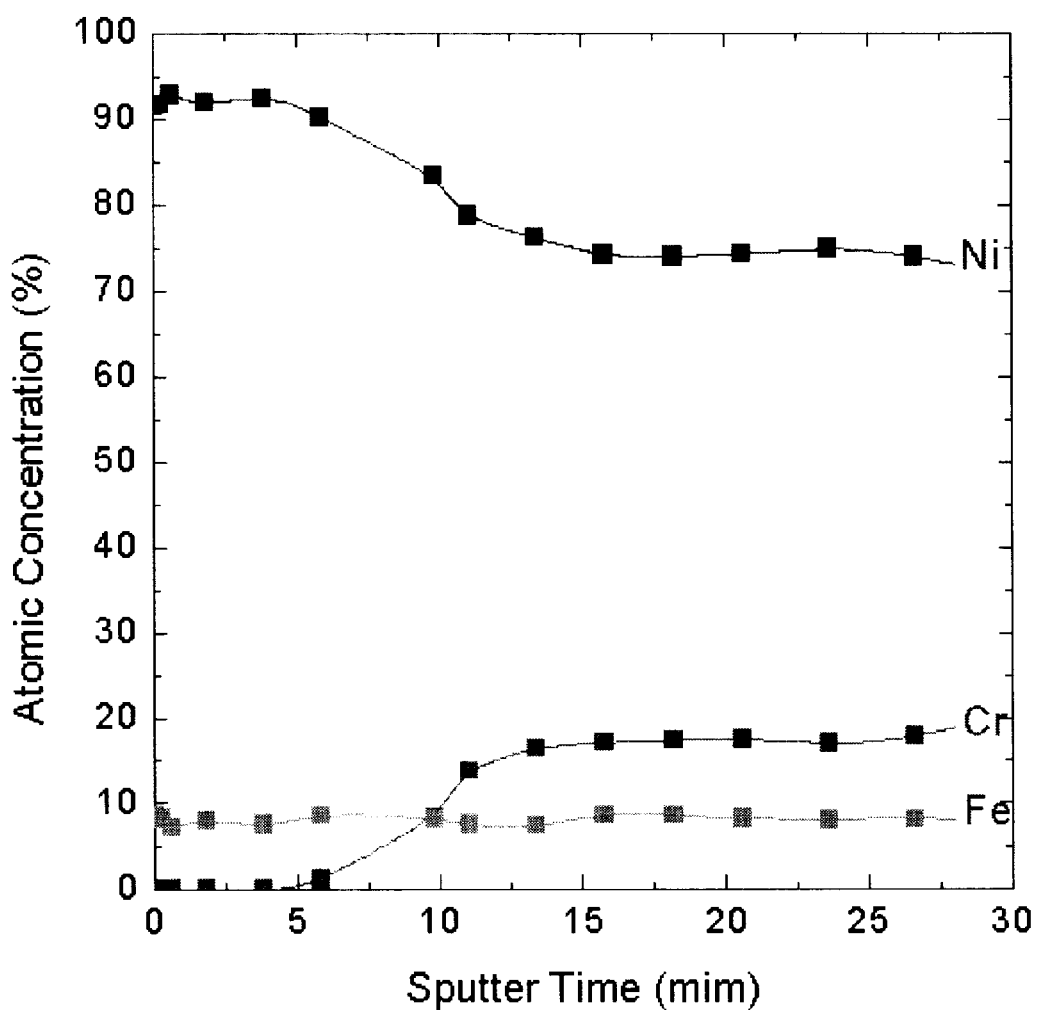
FIG. 2 is a graph showing the depth profiles of the main alloying elements in the film formed at the crack tip of the steam generator tubes in the caustic solution, wherein no inhibitor is added.
Figure 3:
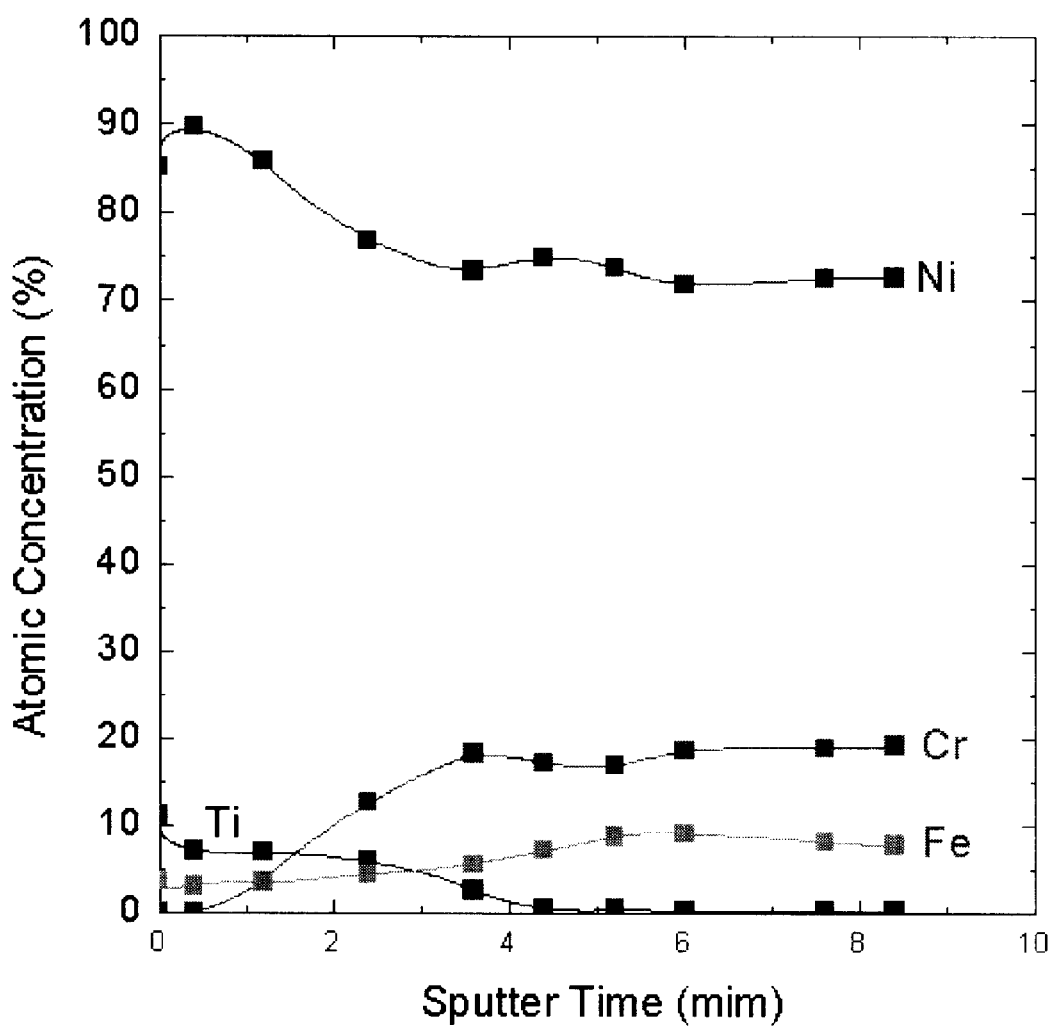
FIG. 3 a graph showing the depth profiles of the main alloying element and Ti in the film formed at the crack tip of steam generator tubes in the caustic solution, wherein a conventional inhibitor, the titanium oxide, is added.
Figure 4:
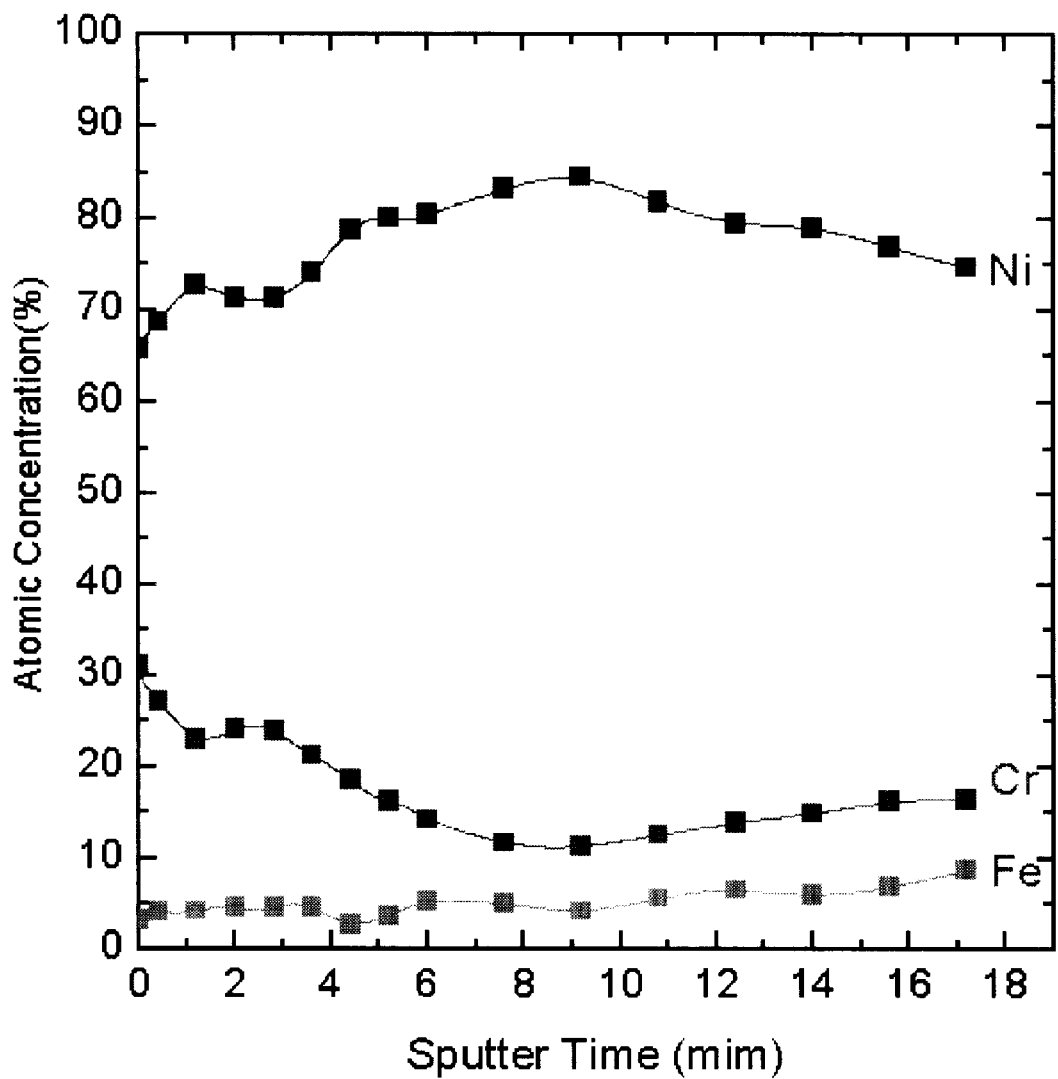
FIG. 4 a graph showing the depth profiles of the main alloying elements in the film formed at the crack tip of steam generator tubes in the caustic solution, wherein the cerium boride according to the present invention is added.

FIG. 2 is a graph showing the depth profiles of the main alloying elements, measured with a scanning Auger spectroscope, in the surface film formed at the crack tip of the steam generator tubes in the caustic solution, wherein no inhibitor is added, and FIGS. 3 and 4 are for the titanium oxide and for the cerium oxide, respectively.

The depth profiles of the elements in the film were obtained by sputtering with argon. The compositions at the left region, as shown in FIGS. 2, 3 and 4, represent the compositions at the outer layer of the film.

As shown in FIG. 2, with no inhibitor, no chromium was observed in the outer layer of the film and thus the film was found to be significantly chromium-depleted.

With the conventional inhibitor, titanium oxide, the extent and the depth of the chromium-depletion in the film were found to be less significant than that with no inhibitor (FIG. 3).

To the contrary, when the cerium boride was added as an inhibitor for stress corrosion cracking, chromium-depleted region in the film was not observed. Further, it was found that chromium was enriched in the outer layer of the film.

It was widely acknowledged that chromium oxides play an important role in improving the resistance to localized corrosion, such as pitting, stress corrosion cracking, etc.

As thus, the cerium boride according to the present invention can highly improve the resistance to stress corrosion cracking by forming a protective and chromium-enriched oxide film. This is shown in FIG. 4. That is, the inhibitor and the inhibiting method according to the present invention will exhibit the improved inhibition of stress corrosion cracking, which is distinguished from the conventional inhibitors or methods.

FIG. 5 is a graph showing the inhibiting effect of the cerium boride on stress corrosion cracking of Alloy 600 steam generator tubes in lead oxide-contaminated environment.

The experiment was conducted in 10% NaOH aqueous solution containing 5,000 ppm of PbO at 315° C.

The specimens for the stress corrosion cracking tests were fabricated as C-ring and stressed until their outer diameter was reduced by 1.5 mm. To accelerate the stress corrosion cracking rate, the specimens were polarized at a potential of 150 mV above the corrosion potential. The amount of the inhibitors used was 4 g/L for the titanium oxide and was 1 g/L for the cerium boride. After 5 days, the percentage of the stress corrosion crack depth relative to the thickness of the specimens was measured and the result thereof is shown in FIG. 5.

The depth of the crack formed in the caustic solution containing no inhibitor was measured to be 70% of the thickness of the specimens, and 40% in the solution with the titanium oxides. However, with the cerium boride according to the present invention, no cracking was formed.

Therefore, the inhibitor, cerium boride, according to the present invention has a superior inhibiting effect on stress corrosion cracking in the environment contaminated with lead compounds.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for inhibiting intergranular corrosion and stress corrosion cracking occurring on steam generator tubes in the secondary side of nuclear power plants, comprising the step of supplying cerium boride as an inhibitor for stress corrosion cracking into the secondary feed water of nuclear power plants.

2. The method as set forth in claim 1, wherein the cerium boride is used in an amount of from 0.1 ppb to 100 ppm.

3. The method as set forth in claim 1, wherein the pH of the secondary feed water at 20° C. is from 5.0 to 9.5 and the temperature is lower than 330° C.

4. The inhibition method as set forth in claim 1, wherein the cerium boride-added feed water is circulated to form a protective film on the surface of the steam generator tubes in nuclear power plants.

5. The method as set forth in claim 1, wherein the circulation of the cerium boride-added feed water is stopped for from 0.5 to 240 hours to form a protective film on the surface of the steam generator tubes in nuclear power plants.

6. The method as set forth in claim 1, wherein the secondary feed water is contaminated with at least one lead compound.

7. The method as set forth in claim 6, the lead compound is selected from the group consisting of lead oxide, lead chloride and lead sulfide.

* * * * *